United States Patent [19]

Rutten et al.

[11] Patent Number: 5,310,866
[45] Date of Patent: May 10, 1994

[54] PROCESS FOR STRETCHING A SWOLLEN FLEXIBLE-CHAIN POLYMER

[75] Inventors: Hendrikus J. J. Rutten, Maastricht; Adrianus W. M. Braam, Susteren, both of Netherlands

[73] Assignee: DSM N.V., Netherlands

[21] Appl. No.: 937,185

[22] Filed: Aug. 31, 1992

[30] Foreign Application Priority Data

Sep. 6, 1991 [NL] Netherlands .......................... 9101503

[51] Int. Cl.$^5$ ................................................ C08F 6/00
[52] U.S. Cl. ..................................... 528/502; 264/164; 264/181; 264/197; 264/210.7
[58] Field of Search ................ 528/502; 264/164, 181, 264/197, 210.7

[56] References Cited

U.S. PATENT DOCUMENTS

| | | | |
|---|---|---|---|
| 4,329,874 | 4/1983 | Stoy | 524/27 |
| 4,416,946 | 11/1983 | Bolt | 428/422 |
| 4,806,579 | 2/1989 | Calvert et al. | 524/211 |

FOREIGN PATENT DOCUMENTS 1102794  2/1968  United Kingdom .

*Primary Examiner*—Paul R. Michl
*Assistant Examiner*—Edward Cain
*Attorney, Agent, or Firm*—Cushman, Darby & Cushman

[57] ABSTRACT

Process for stretching an article substantially consisting of a flexible-chain polymer, which is swollen in a solvent for that polymer, in which process an article substantially consisting of a copolymer of the polymer with a second polymer is swollen in a selective solvent for the flexible-chain polymer, and stretched, and an article containing an oriented flexible-chain polymer with a dichroic ratio of at least 1.1.

17 Claims, No Drawings

PROCESS FOR STRETCHING A SWOLLEN FLEXIBLE-CHAIN POLYMER

The invention relates to a process for stretching an article containing a flexible-chain polymer, which is swollen in a solvent for this polymer.

Such a process is known from EP-A-192.303, where an article of ultra-high molecular weight polyethylene is exposed to a swelling agent, particularly a solvent for the polyethylene, at a temperature above the solution temperature and is stretched after cooling to below the solution temperature. The stretching is carried out for the purpose of orienting the polymer molecules in the article. This orientation usually involves an improvement of certain properties, in this case the tensile strength and the modulus, of the polymer in the article. It has been found according to said process that the polyethylene treated in this manner can be stretched to a very high degree.

A disadvantage of this known process is that, if applied to a number of flexible-chain polymers, which in principle, by virtue of their structure, ought to be highly orientable, it does not result in the high draw ratio to be expected and, in the case of ultra-high molecular weight polyethylene, actually reached.

The object of the invention is to provide a process for orienting to a high degree a swollen flexible-chain polymer, hereinafter referred to as first polymer, which process has a wider application than the processes known for this purpose so far.

This object is achieved according to the invention in that the article substantially consists of a block copolymer of the first polymer with a second polymer and is swollen in a selective solvent for the first polymer and stretched.

It has been found that by applying the process according to the invention the blocks of the first polymer in the block copolymer can in many cases be stretched substantially further and hence be better oriented than the first polymer in the form of a homopolymer, so that the favourable properties going with the orientation of the first polymer feature more strongly in the article produced by applying this process. This is of particular advantage when the process according to the invention is applied to, for instance, aliphatic polyamides, polyesters, polyvinyl fluoride (PVF) and polyvinylidene fluoride (PVDF), because for these polymers no other processes have so far been known to reach high degrees of orientation. For instance, from a publication by E. L. Nix in 'Ferroelectrics', 1981, Vol. 32, pp. 103–114, it is known that the pyroelectric and piezoelectric properties of articles produced from polyvinylidene fluoride (PVDF) improve during the stretching. A problem in the process is the limited stretchability and in the said publication by E. L. Nix it is stated in this respect that further improvement could be reached by further stretching under suitable circumstances. So far, however, no suitable circumstances have been found to make further stretching possible. K. Nakagawa and M. Amano, as published in 'Polymer Communications', 1986, Vol. 27, pp. 310–314, use microwave heating to improve the stretchability of PVDF. Though this technique did turn out to be successful with polyoxymethylene, no improved stretchability was achieved for PVDF. In a publication in Journal of Applied Polymer Science, Vol. 41, pp. 105–116 (1990), J. Smook, G. H. J. Vos and H. L. Doppert conclude that the orientation potential of polyamides is limited, independent of the spinning technique applied, including the solution spinning technique used with excellent results for other flexible-chain polymers like polyolefins, polyvinyl alcohol and polyacrylonitrile. The process according to the invention now makes it possible for the said flexible-chain polymers that have so far shown a poor stretching capacity and consequently a poor orientation capacity on a molecular scale to be further oriented than possible with the state of the art and other known processes.

In the process according to the invention the chains of a flexible-chain polymer are oriented by stretching an article substantially consisting of a block copolymer of such flexible-chain polymer with a second polymer. Stretching here is understood also to include other processes and techniques to increase the size of an article in at least one direction during the simultaneous reduction of the size in at least one other direction. Examples are rolling, compression and extrusion under conditions involving a high shear of the extrudate.

The process according to the invention can be used also for block copolymers of polymers that can be stretched as such by applying the known processes. The stretching of just one of the polymer components in the block copolymer yields an article in which a combination is present of both the properties of the stretched first polymer and of the non-stretched second polymer. By making a suitable choice of the first and of the second polymer, articles having a favourable combination of properties can thus be produced. It is possible also for the second polymer in the copolymer to be stretched as well. Such stretching may precede as well as follow the drawing of the first polymer and be carried out in any way suited for this second polymer, if so desired also in a selective solvent for the second polymer. This makes it possible for the two polymers to be stretched under conditions optimized for each polymer separately. Moreover, by the alternate stretching of the first and the second polymer a very high degree of total orientation may be achieved. The chains of the first and of the second polymer can thus be oriented also in different directions.

A flexible-chain polymer is understood to mean a polymer in which, in the molten or dissolved state, the chains are present in the form of randomly tangled structures. During the crystallization of the polymer by the solidification of the melt or gellation of the solution, considerable portions of the lengths of the chains may fold, roll up or take a form otherwise deviating from an extended state. The formation formed is substantially maintained even after cooling or removal of the solvent. This behaviour is expressed in the Characteristic Ratio $C_\infty$ of the polymer, as defined on page VII-3 of the 'Polymer Handbook', 3rd ed., J. Brandrup and E. H. Immergut. The $C_\infty$ of a flexible-chain polymer to be applied in the process according to the invention is preferably 25 at most and more preferably 15 at most.

Block copolymers can be divided into three types depending on the relative arrangement of the blocks of the first polymer, A, and the second polymer, B. The arrangement according to the three types can be represented as AB, BAB and $(AB)_n$. In the process according to the invention preference is given to the use of copolymers of the BAB triblock type or the $(AB)_n$ multiblock type because all or virtually all chains of the first polymer contained therein are bonded at either end to a chain of the second polymer. More preference is given to the use of copolymers of the multiblock type because the presence of long chains therein will result in a better cohesion of the material and a smaller risk of collapse during the stretching.

In order to retain many of the properties of the first polymer in the copolymer it is an advantage for the chosen share of the first polymer to be sufficiently large, and preferably the share of the first polymer in the chosen copolymer is at least 25% (wt), more preferably at least 50% (wt) and most preferably at least 70% (wt).

Not every copolymer in which the first polymer is present is suited for use in the process according to the invention. The choice of the second polymer is limited by the condition that a solvent for the first polymer must be found in which, under suitable chosen conditions, the second polymer does not swell, or only to a very small degree. A solvent as described above is referred to in this application as a selective solvent for the first polymer. For almost all polymers and particularly for the polymers mentioned hereinbefore, solvents and their solution temperatures, $T_s$, that is the lowest temperatures at which the polymer completely dissolves in the solvent, are known per se, and so is the fact that the second polymer does or does not dissolve in a particular solvent and, if it does, to what degree. For a great many polymers solvents and nonsolvents are mentioned in 'Polymer Handbook', 3rd ed., J. Brandrup and E. H. Immergut. The solution behaviour of combinations of polymers and solvents not mentioned in that publication or elsewhere can conveniently be determined by the person skilled in the art by means of routine experiments.

The article to be stretched is formed from the copolymer. Articles that qualify for stretching are, for instance, fibres, bars, pipes, tapes, sheets and films. The article can be formed by using the techniques known per se for that purpose, for instance by the moulding of granules or powder of the copolymer at elevated temperature, or by extrusion or spinning of a melt or a solution.

The article thus formed is swollen in the selective solvent for the first polymer. This swelling is effected by exposing the article to the solvent, preferably by immersing the article in the solvent. It has been found that as the temperature rises the polymer can absorb an increasing amount of solvent and preferably the swelling takes place at a temperature of at least $T_s - 30°$ C., where $T_s$ is the solution temperature of the chosen polymer-solvent combination. The temperature at which the polymer is exposed to the solvent is more preferably at least $T_s - 15°$ C. and most preferably this temperature at least equals the solution temperature $T_s$. The temperature at which the article is exposed to the solvent cannot be any chosen high temperature. This temperature is preferably below the boiling point of the solvent and also below the temperature at which the copolymer shows thermal degradation.

The time required to cause the first polymer to swell sufficiently to obtain the desired stretchability depends on the affinity between polymer and solvent, on the dimensions, particularly the thickness, of the article and on the temperature. The time required for a chosen polymer-solvent combination can easily be determined by experiment and is usually a few minutes at most.

The swollen article thus obtained is stretched. Despite the fact that a part of the article consists of the first polymer in a swollen form and contains a large amount of solvent, it has been found to be well manageable, supposedly due to the binding presence of the second polymer. This makes it possible for the stretching to be effected in one or in two directions depending on the intended use of the article stretched, using the customary techniques and installations for the stretching of polymeric articles.

Surprisingly, it has now been found that this stretching can be effected at a temperature very close to the solution temperature or at even a higher temperature, which has proved not to be effectively possible, or hardly so, with a swollen article of the first polymer in a homopolymeric form. The stretching is preferably carried out at a temperature of at least $T_s - 30°$ C. and more preferably of at least $T_s - 15°$ C. and most preferably at a temperature equalling at least the solution temperature. The chosen temperature at which the article is stretched cannot be any high temperature. This temperature is preferably below the boiling point of the solvent and also below the temperature at which the copolymer shows thermal degradation.

From the stretched article, from which a part of the solvent may have evaporated during the stretching, but which usually still contains a substantial amount of solvent, the solvent is removed in one of the processes customary for this purpose, for instance by evaporation or by extraction, followed by drying. Before removal of the solvent, any shrinkage of the article, particularly in the direction in which stretching took place, must be avoided in order to prevent the stretched polymer chains from folding again and from possibly becoming entangled with each other causing the orientation achieved by the stretching and the improved properties that go with it to be lost again.

The degree of orientation of the flexible-chain polymer is reflected in the value of the dichroic ratio. This ratio is determined by means of polarized infrared spectroscopy (IR) from the absorption intensities measured by means of IR radiation polarized parallel to the direction of stretch, $A_{par}$, and by means of IR radiation polarized in a direction perpendicular thereto, $A_{perp}$. The wavelength of the IR radiation is so chosen that it corresponds with an absorption band of one of the chemical bonds in the polymer. If the relevant bond absorbs IR radiation polarized parallel to the direction of the polymer chains, the dichroic ratio is defined as $$R = A_{par}/A_{perp}.$$

If this absorption occurs in the direction perpendicular to the direction of the chain, the dichroic ratio is defined as $$R = A_{perp}/A_{par}$$

For each polymer the bonds suited for determining the dichroic ratio and the relevant IR wavelengths are known per se. For nylon 6.6, for instance, the (C=O)- and (N—H)-bonds absorbing in a direction perpendicular to the direction of the chain are mostly used to determine the dichroic ratio and consequently the degree of orientation.

The flexible-chain polymer in the articles produced by applying the process according to the invention has a degree of orientation higher than that of the articles of the polymer known so far and as a consequence said articles have better mechanical properties, particularly a modulus higher than the articles known.

The said high degree of orientation is reflected by the value of the dichroic ratio, which is at least 1.1.

The invention therefore also relates to an article substantially consisting of a block copolymer of a first and a second polymer, which first polymer is an oriented flexible-chain polymer of which the dichroic ratio, determined by applying polarized infrared spectroscopy, is at least 1.1.

The value of the dichroic ratio is preferably at least 1.3 and more preferably at least 1.5.

The flexible-chain polymer in the article according to the invention is preferably chosen from the group consisting of polyvinyl fluoride, polyvinylidene fluoride, aliphatic polyamides and polyesters because it is particularly these polymers of which no highly oriented articles are known.

The invention will be elucidated by means of the following examples. The measuring results have been obtained in the manner described below.

The initial modulus is determined with a Zwick 1435 tensile testing machine on samples having a span length of 50 mm at a drawing speed of 5 mm/min according to ASTM standard D790–86.

The large-angle X-ray diffraction patterns are recorded with a cast-film camera, a Philips PW 1729 generator being used as X-ray source providing Ni-filtered Cu (K$\alpha$) radiation with a wavelength of 0.154 nm. The distance between sample and film is 5 cm.

The polarized infrared spectra are recorded with a Perkin Elmer 1760 FTIR spectrometer.

EXAMPLE I

Modified nylon 6,6 is made by adding a solution of adipoyl chloride and 4,4'-azobiscyanovaleric acid chloride in dichloromethane in drops to a solution of hexamethylene diamine and sodium hydroxide in water at 0° C. The polymer formed, consisting of nylon 6,6 with random azo groups contained therein, is subsequently filtered off, washed and dried, dissolved in phenol and heated in the presence of acrylonitrile in an $N_2$ atmosphere to 70° C., in which process a block copolymer of nylon 6,6 and PAN is formed.

The PAN and nylon contents of the block copolymer are determined with infrared spectroscopy. The average size of the nylon blocks is calculated from the viscosity-average molecular weight, $M_v$, of the modified nylon 6,6, determined in a 90% formic acid solution in water at 21° C.

At 180° C. a 10% by weight solution in dimethyl sulphoxide (DMSO) is prepared of a block copolymer of nylon 6,6 and PAN produced in the manner described above. The nylon:PAN weight ratio in the copolymer is 61:39. The $M_v$ of the nylon blocks is 21,000 g/mole. The solution is poured out into a bowl and cooled to 70° C. At this temperature the solvent is evaporated under vacuum. From the film obtained strips measuring 0.5 × 5.0 cm are cut. These strips are kept in a phenol bath of 100° C. for 5 minutes. Phenol is a selective solvent for nylon. The phenol-containing films treated in this manner are stretched over a hot plate at 85° C. The maximum draw ratio is 10×. The phenol is removed from the stretched strip by evaporation, in which process the strip is set between grips so that no shrinkage is possible lengthwise or across. The dichroic ratio of the nylon, determined on the (N—H) bond at a reciprocal wavelength of 3310 cm$^{-1}$, is 1.87.

COMPARATIVE EXPERIMENT A

Example I is repeated except that the strips of nylon-PAN copolymer are stretched in dry condition at 125° C up to a maximum draw ratio of 7×. The dichroic ratio of the PAN, determined on the (C≡N) bond at a reciprocal wavelength of 2245 cm$^{-1}$, is 2.95, of the nylon, determined on the (N-H) bond, 0.45. From the above it may be concluded that during the stretching the orientation of the molecular axes of the PAN chains is parallel to the direction of stretch, unlike the nylon chains, the direction of the molecular axes of which is substantially perpendicular to the direction of stretch. This shows that only the PAN participated in the stretching and that there was no orientation of the nylon chains in the direction of stretch.

EXAMPLE II

Comparative experiment A is repeated. After stretching, the dry film is kept in trichloroethanol for 3 minutes at 100° C. It was kept at a constant length. After preferential swelling of the nylon blocks, the film can yet be stretched at 85° C. to a total draw ratio of 13. After drying of the stretched film at constant length, the modulus is 12.6 GPa. After the dry stretching, the dichroic ratio of the nylon, determined as above, is 0.43 and after the second step, in which the nylon is stretched in swollen condition, 2.01. This shows that the nylon chains are oriented in the direction of stretch only after their stretching in swollen condition.

EXAMPLE III

Example I is repeated with a nylon 6,6-PAN block copolymer in which the nylon : PAN weight ratio is 53 : 47. The viscosity-average molecular weight of the nylon blocks is 13,600 g/mole.

The film was kept in a bath with trichloroethanol at 100° C. for 3 minutes and after that stretched 7 times at 85° C. After drying at constant length, the film was found to have a modulus of 7.1 GPa. The PAN blocks are after-stretched at 125° C. to a total draw ratio of 12. The modulus is 11.6 GPa.

COMPARATIVE EXPERIMENTS B AND C

Nylon 6,6 with an $M_v$ of 47,000 g/mole is poured out in the form of a film from a 10% solution in DMSO. After drying of the film, strips are cut from it measuring 5 cm × 0.5 cm.

At 85° C. such a strip cannot be stretched; the film breaks with a brittle fracture. At 220° C., a nylon 6,6 strip can be stretched to a draw ratio of only 4. The modulus is only 4.6 GPa and the dichroic ratio 0.50.

A third strip is immersed in a phenol bath of 100° C. The strip dissolves completely, so that it cannot be stretched.

EXAMPLE 5

A PAN-polyester block copolymer is synthesized according to the process described in E. Lanze at al., J. Pol. Sci., Pol., Phys, 11 (95, (1973). To this end, first a polyester is synthesized from adipoyl chloride and bisphenol-A with random incorporation therein of 1(p-hydroxyphenyl)-1,2-propane-dione-2-oxime in an amount of 5% calculated on the bisphenol-A.

This prepolymer is dissolved in a mixture of 80% dimethyl formamide (DMF) and 20% acrylonitrile (AN) and irradiated with light with a wavelength of 350 nm.

After being irradiated with light for 1 hour the block copolymer formed is separated off and purified. The PAN : polyester weight ratio is determined by means of H—NMR and is found to be 55:45.

Of the block copolymer a 10% (wt) solution in DMF is prepared at 80° C. The solution is poured out in the form of a film and dried by evaporation. From the film a strip of 5.0 cm×0.5 cm is cut. The strip is kept in tetrahydrofuran at 30° C. for 2 minutes and stretched to 5 times at 30° C. In a manner analogous to that described in Example I the value of the dichroic ratios shows that only the polyester blocks are oriented. The PAN blocks have not been oriented, or only to a small degree. The modulus of the strip is 6 GPa.

COMPARATIVE EXPERIMENT D

Example 5 is repeated using DSMO, a non-selective solvent. When immersed at 30° C., the film does not change and it cannot be stretched at this temperature. When the temperature is raised to 110° C., the whole film shows considerable swelling and an unmanageable film is formed which sticks to the hot plate, so that it is not possible to obtain an oriented film.

We claim:

1. A process for stretching an article containing a flexible-chain polymer, and article consisting essentially of a block copolymer of a first and a second polymer, said first polymer being said flexible-chain polymer, wherein said article is swollen in a solvent selected from said first polymer, and then stretched, whereby an article containing an oriented first polymer is obtained.

2. Process according to claim 1, characterized in that the share of the first polymer in the copolymer is at least 25% (wt).

3. Process according to claim 1, characterized in that the share of the first polymer in the copolymer is at least 50% (wt).

4. Process according to claim 1, characterized in that the first polymer is chosen from the group consisting of polyvinyl fluoride, polyvinylidene fluoride, aliphatic polyamides and polyesters.

5. Process according to claim 1, characterized in that the swelling takes place at a temperature of at least $T_s-30°$ C., where $T_s$ is the solution temperature of the first polymer in the solvent.

6. Process according to claim 1, characterized in that the swelling takes place at a temperature of at least $T_s-15°$ C. where $T_s$ is the solution temperature of said first polymer in said selected solvent.

7. Process according to claim 6, characterized in that the swelling takes place at a temperature which at least equals the solution temperature.

8. Process according to claim 1, characterized in that the stretching takes place at a temperature of at least $T_s-30°$ C.

9. Process according to claim 8, characterized in that the stretching takes place at a temperature of at least $T_s-15°$ C.

10. Process according to claim 9, characterized in that the stretching takes place at a temperature which at least equals the solution temperature.

11. Article substantially consisting of a block copolymer of a first and a second polymer, which first polymer is an oriented flexible-chain polymer, of which the dichroic ratio, determined with polarized infrared spectroscopy, is at least 1.1.

12. Article according to claim 11, characterized in that the dichroic ratio is at least 1.3.

13. Article according to claim 11, characterized in that the flexible-chain polymer is chosen from the group consisting of polyvinyl fluoride, polyvinylidene fluoride, aliphatic polyamides and polyesters.

14. A process for stretching an article, said article consisting essentially of a block copolymer of a first and a second polymer, wherein said article is swollen in a first solvent selected from said first polymer, and then stretched, said article then being swollen in a second solvent selected for said second polymer, and then stretched, whereby an article containing oriented first and second polymers is obtained.

15. A process for stretching an article according to claim 14, wherein the orientation of said first polymer is different than that of said second polymer.

16. A process for stretching an article according to claim 14 wherein the degree of said orientation for each polymer exceeds that achieved by similarly stretching a homopolymer of each polymer.

17. A process for stretching an article according to claim 1 wherein the degree of said orientation exceeds that achieved by similarly stretching a homopolymer of said first polymer.

* * * * *